Nov. 5, 1946.    W. H. TURNER    2,410,466
BONDED REINFORCING FRAME
Filed Nov. 8, 1944

*INVENTOR.*
WILLIAM H. TURNER
BY William D. Hall
ATTORNEY

Patented Nov. 5, 1946

2,410,466

UNITED STATES PATENT OFFICE 2,410,466

BONDED REINFORCING FRAME

William H. Turner, Brielle, N. J.

Application November 8, 1944, Serial No. 562,539

5 Claims. (Cl. 160—371)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a method for reinforcing an edge of any sheet-like material by means of reinforcing wedges and a channel, the method involving a technique for forming and bonding of a panel or other sheet-like material into one rigid structure with a materially reinforced edge.

In numerous molding processes, such as molding of resin-bonded plywoods, large structures having flat, compound or spherical shapes are produced, the resulting structures ordinarily requiring their subsequent "fitting out," involving interconnecting of the related molded structures, and connecting to these structures of various auxiliary equipment. The panel-bonding process involves bonding together of laminations such as wood veneer, paper, fabric, etc. with heat-and-moisture-resisting synthetic plastic glues, the bonding being accomplished by subjecting the glue-coated laminations to pressure, or heat and pressure over the bond-producing period of the time. Because of increased strength and modulus of elasticity (Machine Design, July 1942, pp. 52-57), the impregnated plywood or paper may be subjected to relatively high stresses, and since in the application of any load the edges of the impregnated material are frequently involved, localization of strains can be avoided only when the edges are properly reinforced for successfully resisting and distributing the load over the wider available areas.

The necessity for localized reinforcement of the edges has been fully realized in the past, and several methods are now available and are in production use for accomplishing this result. One of such methods consists of building up the edges to the desired thickness by superimposing a number of additional laminations immediately adjacent to and on both sides of the normal edge, and by molding these added laminations to the border surfaces of the structure. This method, besides being laborious and expensive, does not always produce the sought type of termination and reinforcement and thus lacks mechanical versatility and adaptability.

The present invention is an improvement of the existing edge reinforcing methods. It consists of providing an edge reinforcing channel which is molded to the edge portion of a panel or any other structure needing edge reinforcement by wedging the edge portion of the panel, or of the structure, to a channel by means of two wedges which are coated or impregnated with a suitable bonding material. The combination is bonded together by subjecting it to pressure, or heat and pressure, in the usual manner, thus permanently attaching the channel to the sheet material.

It is, therefore, the principal object of this invention to provide a novel method of reinforcing the edges of any material having a sheet- or panel-like form.

Another object of the invention is to provide a novel method of providing rigid frames for materials whose pliabilities are so high that they are incapable of supporting themselves in the desired manner, thus necessitating the bonding of these materials to the frames; the previously outlined edge reinforcing technique in this case is used for creating the desired frame.

Still another object of the invention is to provide a method of reinforcing the edges of any sheet- or panel-like material, and for imparting to this material the curvature determined by the curvature of the channel used for reinforcing the periphery of the material.

An additional object of this invention is to provide panels or structures with reinforced edges, the reinforcement being obtained by connecting, with the aid of two wedges and glue, a U-shaped channel to the edges of the panel.

The novel features which are believed to be characteristic of the invention are set forth with particularity in the appended claims; the invention itself, however, both as to its organization and method of operation, together with further objects and advantages thereof may best be understood by reference to the following description taken in connection with the accompanying drawing, in which:

Figure 1:
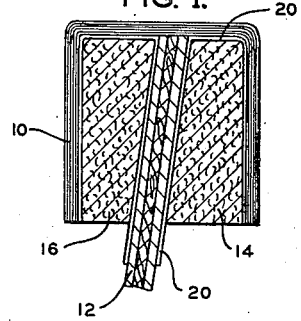
Figure 1 is a cross-sectional view of a plywood panel with the reinforcing channel connected to one of its edges.
Figure 2:
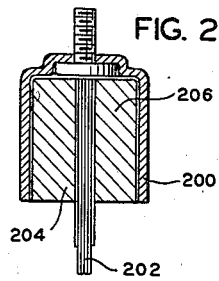
Figure 2 is a modification of Fig. 1.
Figure 6:
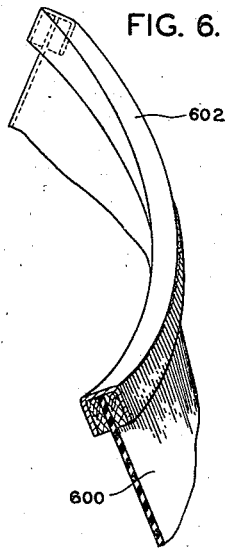

Referring to Fig. 1, a channel 10, made of impregnated plywood, fiber or other easily impregnated material or metal capable of establishing a permanent bond with the glues, is used as an outer border element for a panel 12 made of any material capable of establishing mechanical bond with the glues. Bonding of panel 12 to channel 10 is established by means of two wedges 14 and 16, which fill in the space between the panel and the channel. The wedges and the edge portion of the panel are dipped into, impregnated with, or painted over with the bonding compound 20 prior to their assembly, and then inserted into the channel, as illustrated more fully in Fig. 3, pressure being applied to wedge 320 by a ram or clamp 326. As illustrated in Fig. 1, any desired angle may be imparted to the connection between the reinforcing channel and the panel by varying the shapes of wedges 14 and 16. A slanting relationship between the panel and the channel is illustrated in the Figs. 1, 3 and 7, while Figs. 2 and 6 illustrate the connection in which the sides of the channel are parallel to the surface of the panel. Note angles $\theta$ and $\theta_1$ in Fig. 7; they may be varied by varying the shapes of the wedges.

Figure 2 illustrates a reinforcing channel 200, a panel 202, and wedges 204, 206 which are similar to the elements illustrated in Fig. 1, the differences being in the shape of the wedges, and the materials used for obtaining the sought result. Channel 200 is a metal channel, wedges 204, 206 can be made of plastic, wood, fibre, metal or cellulose; panel 202 can be made of the same materials as the wedges, and the glue used for bonding the elements can be either a synthetic or animal glue. When the panel, channel, and the wedges are made of weldable metals, the use of glues may be dispensed with and the elements joined by welding them together. The channel may be equipped with bolts, one of which is illustrated in the figure.

Figure 3:
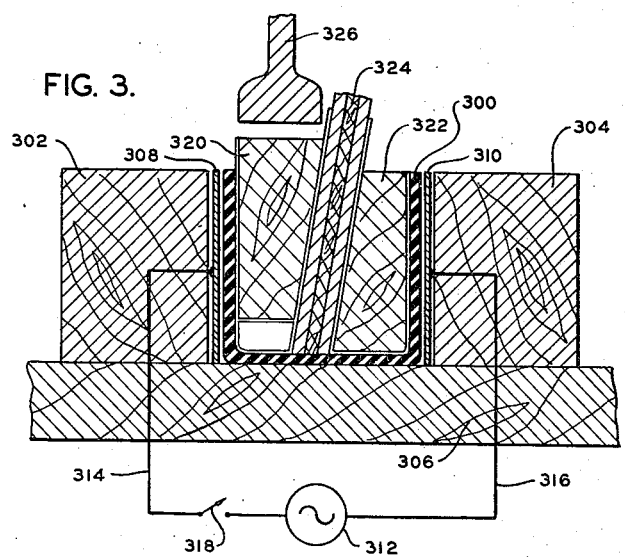
Figure 3 is a cross-sectional view of a jig connected to a source of electric power and a channel in a state of its assembly.

The method of assembling and bonding the structures of the Figs. 1, 2, 4, 6 and 7 is represented diagrammatically in Fig. 3. Depending upon the materials used for the channels, wedges, panel, and the type of bonding desired, the enumerated elements may be either coated, painted, or impregnated with the bonding material to be used. When impregnation is the selected method, the elements must be impregnated according to the known methods prior to their assembling. Upon completion of impregnating, channel 300 is put into a recess provided between side members 302, 304 which are permanently fastened to a base plate 306. The recess is provided with metal plates 308, 310 which are connected to a high frequency source 312 over conductors 314, 316 and a switch 318. Channel 300 should preferably fit tightly into the jig's recess so that subsequent pressure exerted on its side-walls by wedges 320 and 322 should not materially strain or break the channel. The next step consists of inserting wedge 322, panel 324, and pressing down wedge 320 with a ram 326. When wedge 320 is driven into the channel, the excess bonding material, if any, is preferably wiped off, switch 318 is closed, and the entire assembly heated or allowed sufficient time to set in the case of the cold-setting glues, thus establishing the necessary bonding between the elements. In many instances, involving the use of synthetic glues and subsequent heating, proper binding between the elements may be established only when the elements are under pressure. In Fig. 3 this pressure is originally established by ram 326, and is subsequently maintained either by friction or suitable clamps, which keep wedge 320 in its proper place during the baking or setting period of the assembly. If ram 326 is used for keeping wedge 320 in place, it may be provided with a suitable heat-insulating liner so that it does not absorb or conduct the heat away from wedge 320, and the upper portion of wedge 322 and channel 300 may also be covered with some suitable material which would prevent wasteful radiation and flow of heat away from the upper portion of wedge 322 and channel 300.

The advantages of the illustrated method reside in the fact that the jigs represent very simple and inexpensive structures which may be made very readily from such materials as wood. Therefore, wider use of such reinforcement method is made possible, since any small shop possessing no special dyes or expensive presses could build the inexpensive jigs of the type illustrated in Fig. 3. Moreover, the jigs of this type can be built for conforming with any desired curvature making it possible for the shops to handle work of versatile nature, even when it involves making of only one desired model.

When metal is used for reinforcing the panels, high frequency method of heating the assembly may produce localized heating, and as a result may be replaced with the electrical heaters using resistance elements, or replaced with hot air heating bags, oven heating, etc. which would give even temperature distribution.

Figure 5:
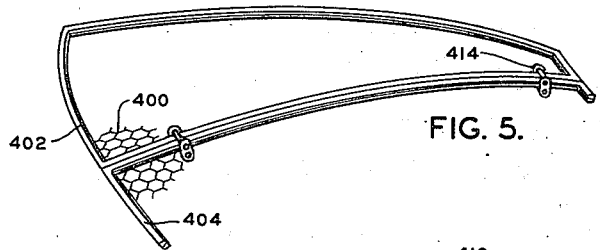
Figure 4:
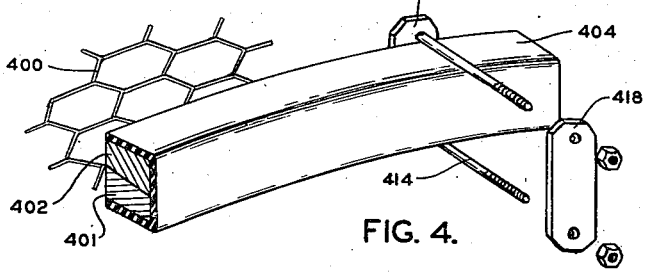

Several applications of the disclosed method are illustrated in Figs. 4 to 7 and will be described presently. Figs. 4 and 5 illustrate the application of the method to a parabolic reflector for an ultra-high frequency antenna. The reflecting surface is provided by the chicken-fence wire 400 which is given the form of a parabolic reflector by means of frames 402, 404, etc. illustrated in Fig. 5. The frames are shaped as parabolic surface sectors which are interconnected to form a unitary mechanical structure possessing the required parabolic form.

Figure 4 illustrates, partly in cross-section and partly in perspective view, a portion of channel 404 and chicken-fence wire 400. As in the case of the Figs. 1 and 2, the wire is permanently connected to frame 404 by means of wedges 401 and 402. These wedges may be made of fibrous material so that the wire mesh sinks into the wedges. Good results are also obtainable with the wooden wedges impregnated with the synthetic glue. The sectors are held together by U bolts 414 provided with plates 416 and 418 which distribute the bolt load over a wider area of the frame. The advantages of the parabolic reflector illustrated in the Figs. 4 and 5 are lightness and simplicity of the resulting structure, and low cost and ease of manufacturing.

Figure 7:
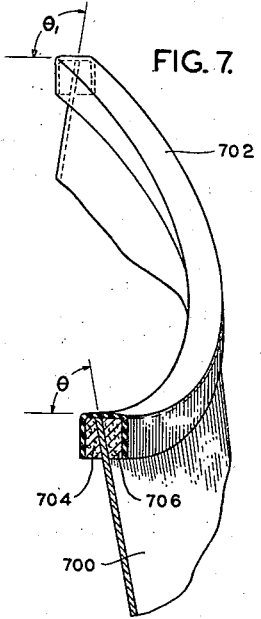
Figures 4, 5, 6 and 7 illustrate various applications of the method disclosed in the Figs. 1 to 3.

Figures 6 and 7 illustrate application of the method to the panels which may have compound curvatures, such as panel 600 illustrated in Fig. 6. When this is the case, channel 602 follows the path of the compound curve, and the panel is connected to the rigidly held channel 602 by bending it until it fits into the channel; the channel, in this instance, acting not only as the edge reinforcing means, but also as a jig which holds panel 600 in the desired manner and imparts to the panel, or at least to the edge of the panel connected to channel 602, the sought curvature.

Fig. 7 illustrates the method of changing the angle or position of panel 700 with respect to channel 702. Wedges 704 and 706 are given such shape that panel 700 forms an $\angle \theta$ which is less than 90° at the nearest end of the channel. At the upper end of the channel, the same angle has been changed to $$\angle \theta_1$$

which is greater than 90°. This shift is obtained by shaping the wedges 706 and 704 so as to make wedge 704 as the entering wedge in the frontal portion of the assembly, and wedge 706 as the entering wedge at the remote portion of the channel.

The word "wedge" as used in the specification and claims is intended to include all means to hold a panel securely within a channel; thus in Fig. 1, wedge 16 diverges inwardly, while wedge 14 converges inwardly, and both wedges have the outer sides parallel to the inner sides of the U member 10. In Fig. 2 the wedges assume the form of the two members 204 and 206 having rectangular cross-sections or only slight convergence for facilitating their insertion into channel 200, which slight convergence may be applied to only one wedge, which is preferably inserted last, and the other wedge being rectangular in cross-section.

From the description of the plastically-bonded reinforcing channel, it should be apparent to those skilled in the art that it possesses many practical advantages; convenient bolt-type connections, such as those illustrated in the Figs. 2, 4 and 5, become quite feasible, thus increasing the application of the bonded channels to many uses which will readily occur to the skilled in the art, and which cannot be enumerated because of the large number of possible applications. Thus Fig. 4 illustrates the application of the method to the construction of an antenna reflector, while Figs. 6 and 7 are very suitable for constructing boats, furniture, etc. One of the important advantages of the method resides in the fact that the sought results may be obtained without resorting to the use of such expensive equipment as cast-steel, dyes, and large hydraulic presses. Another important advantage lies in the fact that lightweight, stiff structures can be obtained without the use of any metal in the construction, thus reducing cost and the manufacturing difficulties. The pressure necessary for forcing wedge 320 down is relatively insignificant because of the small involved areas; the same is true of the jigs, and, therefore, the entire equipment, can be constructed of light parts made locally in small carpenter shops.

The following references are mode a part of this disclosure to aid the understanding of this invention: "High frequency heating," by D. W. Brown, "Plastics," May 1944, pp. 218–226; "Radio frequency heating applied to wood gluing," by R. A. Burwith, et al., I. R. E. P. vol. 31, 1943, p. 529; "Heating wood with R. F. power," by J. P. Taylor, et al., A. S. M. E. T., April 1943, pp. 201–212; U. S. Dept. of Agriculture Pamphlet No. R1277, titled "Urea-Plasticized Wood," "Paper base plastics laminates," by W. B. Darling, Riegel Paper Corp., New York city.

It is believed that the construction and method of manufacturing the bonded reinforcing frame, as well as the many advantages thereof, will be apparent from the foregoing description. It should be understood that while I have shown and described my invention in several preferred forms, reasonable changes and modifications may be made without departing from the spirit of the invention, as sought to be defined in the following claims.

I claim:

1. The combination of a panel and a reinforcing structure for an edge portion of said panel, said structure comprising a U-shaped channel, fitting over the edge portion of said panel, two wedges fitting in said channel and holding said panel in fixed relationship with respect to said channel, said panel fitting between said wedges, and a bonding means interconnecting said channel, wedges, and said panel.

2. The combination of a panel and a reinforcing structure for an edge portion of said panel, said structure comprising a U-shaped channel mounted over the edge portion of said channel, a wedge fitting in said channel on each side of said panel, and a baked synthetic glue bonding said channel, wedges and the edge portion of the panel fitting between said wedges in said channel.

3. The combination of a panel and a reinforcing structure for an edge portion of said panel, said structure comprising a U-shaped channel mounted over the edge portion of said panel, and a filler impregnated with a synthetic glue, fitting in said channel on each side of said edge portion of said panel, for bonding said channel and the edge portion of said panel together.

4. The combination of a panel and a reinforcing structure for an edge portion of said panel normally lying in a single plane, said structure comprising a curved, rigid, U-shaped channel, two wedges fitting in said channel for holding said edge portion in fixed relationship with respect to said channel, and for bending at least the edge portion of said panel until said edge portion follows the curvature of said channel, and a bonding glue interconnecting said channel, wedges and said panel.

5. The combination of a pliable sheet and a reinforcing frame for supporting said sheet, said frame including a U-shaped channel comprising the outer member of said frame, two wedges fitting in said channel and holding said sheet in fixed relationship with respect to said channel, and a bonding means interconnecting said channel, wedges, and said sheet.

WILLIAM H. TURNER.